United States Patent
Xie et al.

(10) Patent No.: US 10,915,191 B2
(45) Date of Patent: Feb. 9, 2021

(54) TOUCH SUBSTRATE, METHOD FOR MANUFACTURING TOUCH SUBSTRATE, AND DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Xiaodong Xie, Beijing (CN); Tsungchieh Kuo, Beijing (CN); Lei Zhang, Beijing (CN); Jing Wang, Beijing (CN); Zouming Xu, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 9 days.

(21) Appl. No.: 16/331,081

(22) PCT Filed: May 7, 2018

(86) PCT No.: PCT/CN2018/085837
§ 371 (c)(1),
(2) Date: Mar. 6, 2019

(87) PCT Pub. No.: WO2018/210150
PCT Pub. Date: Nov. 22, 2018

(65) Prior Publication Data
US 2019/0204975 A1    Jul. 4, 2019

(30) Foreign Application Priority Data
May 16, 2017 (CN) .......................... 2017 1 0342477

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0443* (2019.05);
(Continued)

(58) Field of Classification Search
CPC ...... G06F 3/0412; G06F 3/0416; G06F 3/044; G06F 3/0446
(Continued)

(56) References Cited

U.S. PATENT DOCUMENTS 10,317,768 B2 * 6/2019 Xi .......................... G06F 3/0488
2012/0026128 A1   2/2012 Chen et al.
(Continued)

FOREIGN PATENT DOCUMENTS

CN    104298406 A    1/2015
CN    105094470 A    11/2015
(Continued)

OTHER PUBLICATIONS

International Search Report and Written Opinion of the International Searching Authority (with English language translation of Written Opinion), International Application No. PCT/CN2018/085837, dated Jul. 20, 2018, 12 pp.
(Continued)

*Primary Examiner* — Calvin C Ma
(74) *Attorney, Agent, or Firm* — Myers Bigel, P.A.

(57) ABSTRACT

A touch substrate, a method for manufacturing a touch substrate, and a display device are disclosed. The touch substrate includes a substrate and a plurality of touch units spaced apart from each other on the substrate. The plurality of touch units are arranged in rows and columns. Each of the plurality of touch units includes a first electrode and a (Continued)

second electrode. The first electrode and the second electrode are arranged crosswise and insulated and spaced apart from each other. The first electrodes of the adjacent touch units in one of the columns are connected by a first signal line, and the second electrodes of the adjacent touch units in one of the rows are connected by a second signal line.

15 Claims, 3 Drawing Sheets

(52) U.S. Cl.
CPC .. *G06F 3/0446* (2019.05); *G06F 2203/04102* (2013.01); *G06F 2203/04103* (2013.01); *G06F 2203/04111* (2013.01)

(58) Field of Classification Search
USPC .................................................. 345/173, 174
See application file for complete search history.

(56) References Cited

U.S. PATENT DOCUMENTS

| | | | |
|---|---|---|---|
| 2018/0107316 A1* | 4/2018 | Hanari | G06F 3/0412 |
| 2018/0129330 A1* | 5/2018 | Ding | G06F 3/0412 |
| 2018/0188841 A1 | 7/2018 | Yu | |
| 2019/0102136 A1* | 4/2019 | Yoshitani | G06F 3/147 |
| 2019/0204975 A1 | 7/2019 | Xie et al. | |

FOREIGN PATENT DOCUMENTS

| | | |
|---|---|---|
| CN | 205507727 U | 8/2016 |
| CN | 106406605 A | 2/2017 |
| CN | 107066160 A | 8/2017 |

OTHER PUBLICATIONS

First Office Action and English language translation, CN Application No. 201710342477.1, dated Mar. 4, 2019, 27 pp.

* cited by examiner

TOUCH SUBSTRATE, METHOD FOR MANUFACTURING TOUCH SUBSTRATE, AND DISPLAY DEVICE

CROSS REFERENCE TO RELATED APPLICATIONS

The present application is a 35 U.S.C. 371 national stage application of PCT International Application No. PCT/CN2018/085837, filed on May 7, 2018, which claims the benefit of Chinese Patent Application No. 201710342477.1, filed on May 16, 2017, the contents of which are incorporated herein by reference in their entireties. The above-referenced PCT International Application was published in the Chinese language as International Publication No. WO 2018/210150 A1 on Nov. 22, 2018.

TECHNICAL FIELD

The present disclosure relates to the field of display technologies, and in particular to a touch substrate, a method for manufacturing a touch substrate, and a display device.

BACKGROUND

With the development of technology, touch panels with touch-control function has been applied increasingly. Capacitive touch panel are an important type of touch panel. A touch layer of a typical capacitive touch panel comprises a plurality of strips of touch driving electrodes parallel to each other and a plurality of strips of touch inductive electrodes parallel to each other. Using a conventional touch layer into a flexible display device may causes brittle fracture of film layer(s), thereby reducing the flexibility and quality of the display device.

SUMMARY

According to an aspect of the present disclosure, there is provided a touch substrate. The touch substrate comprises a substrate and a plurality of touch units spaced apart from each other on the substrate. The plurality of touch units are arranged in rows and columns. Each of the plurality of touch units comprises a first electrode and a second electrode. The first electrode and second electrode are arranged crosswise and insulated and spaced apart from each other. The first electrodes of the adjacent touch units in one of the columns are connected by a first signal line, and the second electrodes of adjacent touch units in one of the rows are connected by a second signal line.

In some embodiments, a direction of the row is perpendicular to a direction of the column.

In some embodiments, the first signal line and the second signal line are metal lines.

In some embodiments, the first electrode comprises two first sub-electrodes arranged in the direction of the column and a first connection connected between the two first sub-electrodes. The second electrode comprises two second sub-electrodes arranged in the direction of row and a second connection connected between the two second sub-electrodes. The first connection is insulated and spaced apart from the second connection. In each one of the plurality of touch units, projections of the two second sub-electrodes on the substrate are on both sides of a projection of the first connection on the substrate.

In some embodiments, the second connection is above the first connection, and the projections of the two second sub-electrodes on the substrate are spaced apart from the projection of the first connection on the substrate.

In some embodiments, in each one of the plurality of touch units, the first connection and the first sub-electrodes form an integral structure, and the first sub-electrodes and the second sub-electrodes are arranged in the same layer.

In some embodiments, a material of the first sub-electrode is the same as a material of the second sub-electrode.

In some embodiments, a material of the second connection is the same as a material of the first signal line and the second signal line.

In some embodiments, at least one of a projection of the first sub-electrode on the substrate and a projection of the second sub-electrode on the substrate is a trapezoid.

In some embodiments, the substrate is a flexible substrate.

According to another aspect of the present disclosure, there is provided a display device. The display device comprises the touch substrate according to any of the embodiments of the present disclosure.

According to yet another aspect of the present disclosure, there is provided a method for manufacturing a touch substrate is provided. The method comprises the steps of:
  providing a substrate;
  forming a plurality of touch units spaced apart from each other, wherein the plurality of touch units are arranged in rows and columns, and each of the plurality of touch units comprises a first electrode and a second electrode, the first electrode and the second electrode are arranged crosswise and insulated and spaced apart from each other; and
  forming a first signal line between the first electrodes of the adjacent touch units in one of the columns such that the first electrodes are connected by the first signal line, and forming a second signal line between the second electrodes of the adjacent touch units in one of the rows such that the second electrodes are connected by the second signal line.

In some embodiments, the substrate comprises touch unit regions, each of which corresponds to a respective one of the plurality of touch units. The steps of forming the plurality of touch units spaced apart from each other comprise the steps of:
  forming two first sub-electrodes of the first electrode and a first connection connecting the two first sub-electrodes in the touch unit region, wherein the two first sub-electrodes are arranged in a direction of the column;
  forming two second sub-electrodes of the second electrode in the touch unit region, wherein the two second sub-electrodes are arranged in a direction of the row, and the projections of the two second sub-electrodes on the substrate are on both sides of the projection of the first connection on the substrate;
  forming an insulating spacer above the first connection; and
  forming a second connection above the insulating spacer, wherein the two second sub-electrodes are connected by the second connection.

In some embodiments, the step of forming the two first sub-electrodes of the first electrode and the first connection connecting the two first sub-electrodes in the touch unit region and the step of forming two second sub-electrodes of the second electrode in the touch unit region are conducted simultaneously.

In some embodiments, the step of forming the first signal line between the first electrodes of the adjacent touch units in one of the columns and forming the second signal line between the second electrodes of the adjacent touch units in one of the rows and the step of forming a second connection above the insulating spacer are performed simultaneously.

In some embodiments, the method further comprises the step of:

forming a protection covering the second connection.

BRIEF DESCRIPTION OF THE DRAWINGS

The drawings are used to provide a further understanding for the present disclosure and constitute a part of the specification. The drawings are used to explain the present disclosure together with the following detailed description, but don't constitute any limitation of the disclosure. In the drawing.

DETAILED DESCRIPTION

The specific embodiments of the present disclosure will be described in detail below with reference to the drawings. It should be understood that the specific embodiments described herein are only used to illustrate and explain the present disclosure, and are not intended to limit the disclosure.

Figure 1:
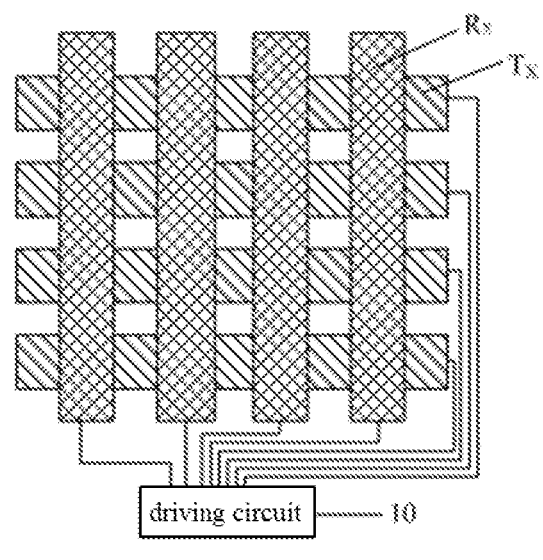
FIG. 1 schematically shows a top view of a related touch layer used in a touch substrate.

FIG. 1 schematically shows the structure of a related capacitive touch panel. As shown in FIG. 1, the touch layer of the capacitive touch panel comprises a plurality of strips of touch driving electrodes Tx parallel to each other and a plurality of strips of touch inductive electrodes Rx parallel to each other. The touch inductive electrode Rx and the touch driving electrode Tx are arranged crosswise to form a capacitance at the intersection of the two electrodes. When the driving circuit 10 inputs driving signals to the touch driving electrodes Tx in turn, in the form of scanning, each touch inductive electrode Rx would generate a corresponding inductive signal. During the touching process, phenomenon such as discharging of electrode, changing of the spacing between electrodes, and changing of dielectric constant of the media between the electrodes etc. may happens at the touch point, thereby the capacitance at the position of the touching may changes. Therefore, during the touching, when the driving signal is input into a touch driving electrode Tx of a specific touch point, the inductive signal of the touch inductive electrode Rx of the same touch point may also be changed. In this way, the touch position can be determined, thereby implementing the touch. In the related capacitive touch panel, the entire area or most of the area of the touch driving electrodes and the touch inductive electrodes are made of indium tin oxide, the flexibility of which is relatively poor. Therefore, using of such a touch layer in a flexible display device may result in brittle fracture of film layer(s), thereby possibly reducing the flexibility and quality of the flexible display device.

Figure 2:
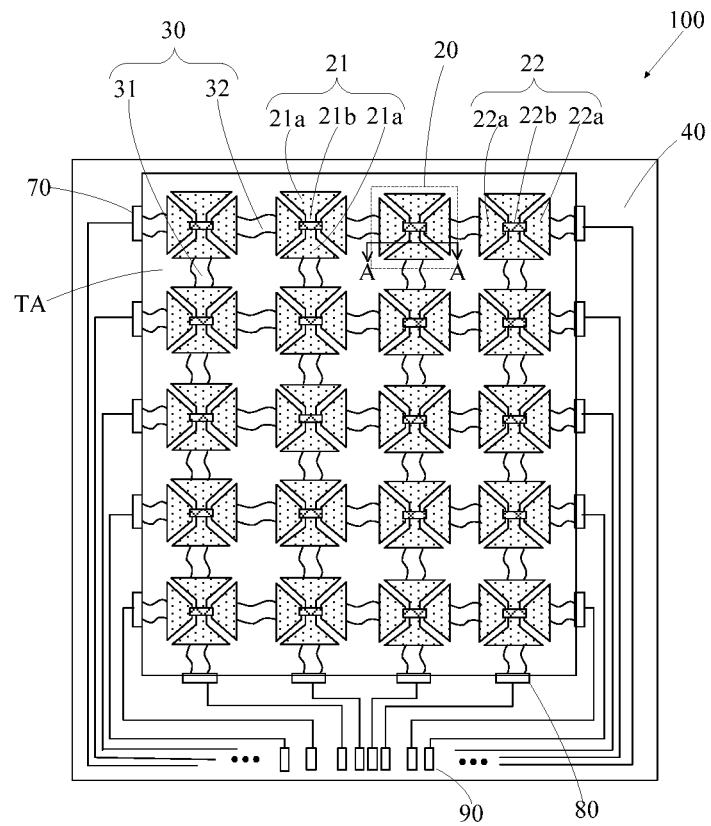
FIG. 2 schematically shows a top view of a touch substrate according to an embodiment of the present disclosure.
Figure 3:
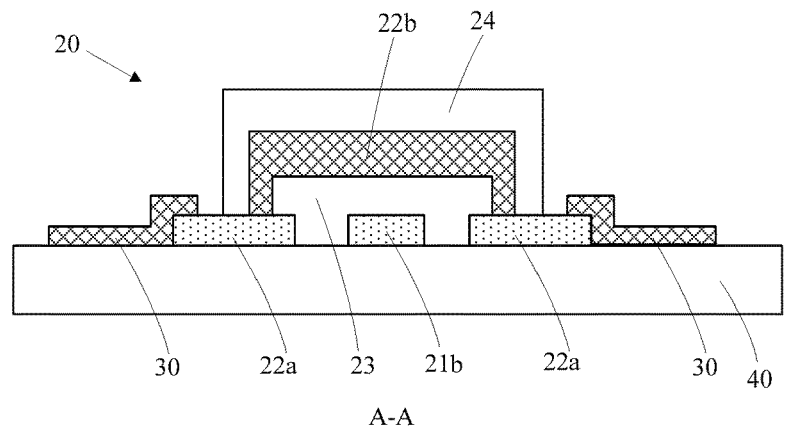
FIG. 3 schematically shows a cross-sectional view of a touch unit in a touch substrate according to an embodiment of the present disclosure.

According to an aspect of the present disclosure, there is provided a touch substrate. FIG. 2 schematically shows a top view of a touch substrate 100 according to an embodiment of the present disclosure. FIG. 3 schematically shows a cross-sectional view of the touch unit 20 in the touch substrate 100 according to an embodiment of the present disclosure, along the line A-A of FIG. 2. As shown in FIG. 2 and FIG. 3, the touch substrate 100 comprises a plurality of touch units 20 spaced apart from each other on the substrate 40. The substrate 40 comprises a touch region TA. The touch units 20 are located at the touch region TA. The plurality of touch units 20 are arranged in a plurality of rows and columns, in an array. It should be understood that the term "row" is not limited the arrangement in a horizontal direction or a lateral direction, and the term "column" is not limited to the arrangement in a vertical direction or a longitudinal direction. Further, the "row" and "column" are not necessarily perpendicular to each other. Each touch unit 20 comprises a first electrode 21 and a second electrode 22 that are arranged crosswise and insulated and spaced apart from each other. The first electrodes 21 of two adjacent touch units 20 in one column are connected by a signal line (i.e., the first signal line 31), and the second electrodes 22 of two adjacent touch units 20 in one row are connected by another signal line (i.e., the second signal line 32).

According to the present disclosure, when the second electrode 22 functions as a touch driving electrode, the first electrode 21 functions as a touch inductive electrode; and when the second electrode 22 functions as a touch inductive electrode, the first electrode 21 functions as a touch driving electrode. The following description of the present disclosure will take the second electrode 22 functioning as the touch driving electrode and the first electrode 21 functioning as the touch inductive electrode as an example for illustration.

In the touch unit 20, a sensing capacitance is formed at the intersection position of the first electrode 21 and the second electrode 22. When the touch driving is performed, the touch driving signals are provided to the second electrodes 22 of the plurality of rows of touch units 20, row-by-row, and the inductive signals of the first electrodes 21 in the plurality of columns of the touch units 20 are detected. Then, the position of the touch is determined according to the detected inductive signals of the first electrodes 21.

Figure 4:
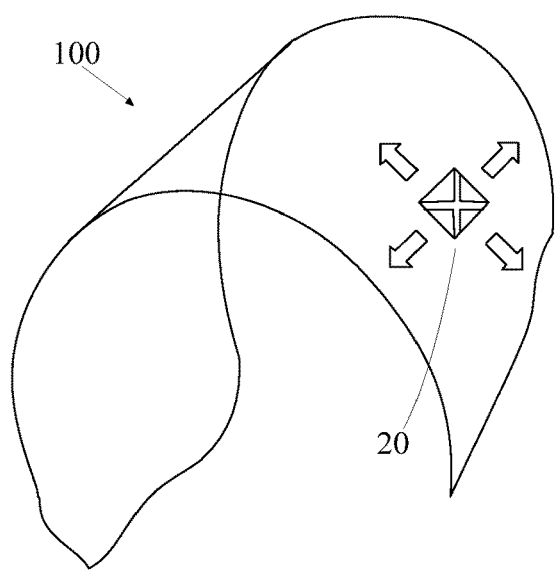
FIG. 4 schematically shows a stress diagram of a bending touch substrate according to an embodiment of the present disclosure.

For a conventional touch substrate, since its touch driving electrode Tx and touch inductive electrode Rx are both integral structures, when the touch substrate is bent, the stress at the bent portion is concentrated, so fracture is easily occurred. In the touch substrate according to the embodiments of the present disclosure, the touch layer for implementing touch is divided into a plurality of touch units. The touch units are spaced apart from each other. FIG. 4 schematically shows a stress diagram of the touch substrate 100 in the case that the touch substrate 100 is a flexible touch substrate and is bent. As shown in FIG. 4, the touch unit 20 according to the embodiments of the present disclosure effectively releases its stress to the surroundings to prevent the first electrode 21 and the second electrode 22 in the touch unit 20 from being fractured. The signal line 30 can be made of any suitable material with a good bending property, as long as the material is electrically conductive. Therefore, the risk of fracture of the touch layer is reduced, and the quality of the touch substrate is improved.

The touch substrate 100 according to the embodiments of the present disclosure is particularly suitable for a flexible touch substrate. In the flexible touch substrate 100, the substrate 40 is a flexible substrate. In some embodiments, the substrate 40 can be made of material such as polyethylene terephthalate (PET), cyclic olefin copolymer (COP), polyimide (PI), or the like.

In some embodiments, the flexibility of the signal line 30 is greater than the flexibility of the first electrode 21 and the second electrode 22. Further, in some embodiments, the signal line 30 is made of the metal with good bending property (for example, silver, copper, aluminum, etc.), and thereby effectively absorbs the bending stress with no fracture when the touch substrate 100 is bent. The width of the signal line 30 can be between 2 μm and 5 μm to ensure a good bending performance while reducing the influence to the display.

The specific structure of the touch unit 20 is shown as in FIG. 2 and FIG. 3. The first electrode 21 comprises two first sub-electrodes 21a arranged in the direction of the column and a first connection 21b connected between the two first sub-electrodes 21a. The second electrode 22 comprises two second sub-electrodes 22a arranged in the direction of the row and a second connection 22b connected between the two second sub-electrodes 22a. In some embodiments, the projection of the first sub-electrode 21a on the touch substrate is a trapezoid, and the short one of the parallel sides of the projection of one of the two first sub-electrodes 21a faces the short one of the parallel sides of the projection of the other of the two first sub-electrodes 22a. In some embodiments, the projection of the second sub-electrode 22a on the touch substrate is a trapezoid, and the short one of the parallel sides of the projection of one of the two second sub-electrodes 22a faces the short one of the parallel sides of the projection of the other of the two second sub-electrodes 22a. It should be understood that the shapes of the first sub-electrode 21a and the second sub-electrode 22a are not limited to trapezoids. In some embodiments, the second connection 22b is located above the first connection 21b and is insulated and spaced apart from the first connection 21b.

As shown in FIG. 2, the projections of the two second sub-electrodes 22a in one touch unit 20 on the substrate 40 are respectively located at the first one and the second one of the two sides of the projection of the first connection 21b on the substrate 40 and are spaced apart from the projection of the first connection 21b, thereby ensuring that the first electrode 21 and the second electrode 22 are insulated and spaced apart from each other. It should be understood that, in some embodiments, the first connection 21b may be above the second connection 22b, and the projections of the two first sub-electrodes 21a in one touch unit 20 on the substrate 40 are respectively located at the first one and the second one of the two sides of the projection of the second connection 22b on the substrate 40 and are spaced apart from the projection of the second connection 22b.

In some embodiments, the first connection 21b and the first sub-electrodes 21a connected thereto are located in the same layer and form an integral structure. The first sub-electrode 21a and the second sub-electrode 22a are located in the same layer and made of the same material. The second connection 22b is made of the same material as the signal line 30. Therefore, during the manufacturing of the touch substrate 100, the first sub-electrode 21a, the second sub-electrode 22a, and the first connection 21b can be formed in one processing step. The second connection 22b and the signal line 30 can also be formed in one processing step. In this way, the manufacturing process is simplified. The expression of "formed in one processing step" means being formed by one set of photolithographic patterning process, specifically comprising coating photoresist, exposure, development, etching, and stripping off the photoresist.

In some embodiments, the first sub-electrode 21 and the second sub-electrode 22 may both be made of a transparent material (for example, indium tin oxide, etc.) such that the touch substrate 100 would not influence the display when applied in a display device. Above the second connection 22b, there may be further provided a protection 24 covering the second connection 22b to prevent the second connection 22b from being scratched or even fractured in a subsequent process. The protection 24 may be a transparent layer. The protection 24 may only cover the second connection 22b or may cover the entire touch substrate 100. The insulating spacer 23 and the protection 24 may be made of a light-sensitive organic insulating material, such that the pattern comprising the insulating spacer 23 and the pattern comprising the protection 24 can be obtained by exposure and development during the manufacturing, thereby simplifying the manufacturing process.

As shown in FIG. 2, one end or both ends of the row of the touch units 20 may be provided with driving signal terminal(s) 70. Each driving signal terminal 70 is connected to the second electrode 22 of an adjacent touch unit 20. One end or both ends of the column of the touch units 20 may be provided with inductive signal terminal(s) 80. The inductive signal terminal 80 is connected to the first electrode 21 of an adjacent touch unit 20. The driving signal terminal 70 is connected to a driving circuit (not shown) through a conductive terminal 90 located at the substrate 40 to receive the touch driving signal provided by the driving circuit. The inductive signal terminal 80 is connected to the driving circuit through the conductive terminal 90 located at the substrate 40, so that the inductive signal of each column of the first electrodes 21 is received by the driving circuit. The inductive signal terminal 80 and the first electrode 21 are connected by metal signal lines 31, and the driving signal terminal 70 and the second electrode 22 are connected by metal signal lines 32. In such a case, the fracture can be prevented when the touch substrate is bent.

According to another aspect of the present disclosure, there is provided a display device, comprising the touch substrate according to any of the embodiments of the present disclosure.

Figure 5:
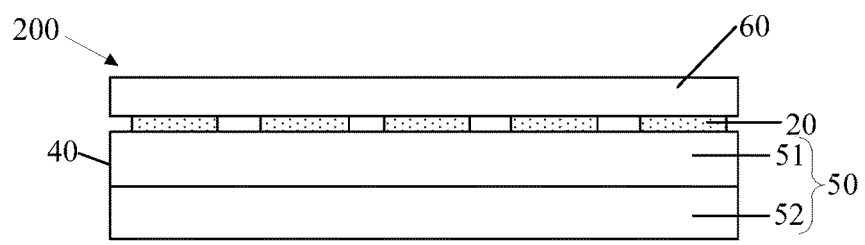
FIG. 5 schematically shows a structural diagram of a display device according to an embodiment of the present disclosure.

FIG. 5 schematically shows a structural diagram of the display device 200 according to an embodiment of the present disclosure. As shown in FIG. 5, the display device 200 may further comprise a display panel 50. The display panel 50 may be a liquid crystal display panel or an electroluminescence display panel such as an OLED display panel or the like. The display panel 50 comprises an array substrate 52 and an assembled substrate 51 that are arranged oppositely. The assembled substrate 51 can function as the substrate 40 of the touch substrate. The touch unit 20 is located on the side of the assembled substrate 51 facing away from the array substrate 52 to form an on-cell structure. In such a situation, a cover plate 60 may be arranged on the side of the touch unit 20 facing away from the substrate 40. In other embodiments, the touch unit 20 may be arranged on the side of the assembled substrate 51 facing the array substrate 52 to form an in-cell structure.

In some embodiments, the display device further comprises a driving circuit (not shown). The driving circuit is connected to the conductive terminal 90 in the touch substrate 100. The driving circuit is used to provide touch driving signal to each row of the second electrodes 22 and detect the inductive signals on each column of the first electrodes 21.

Figure 6:
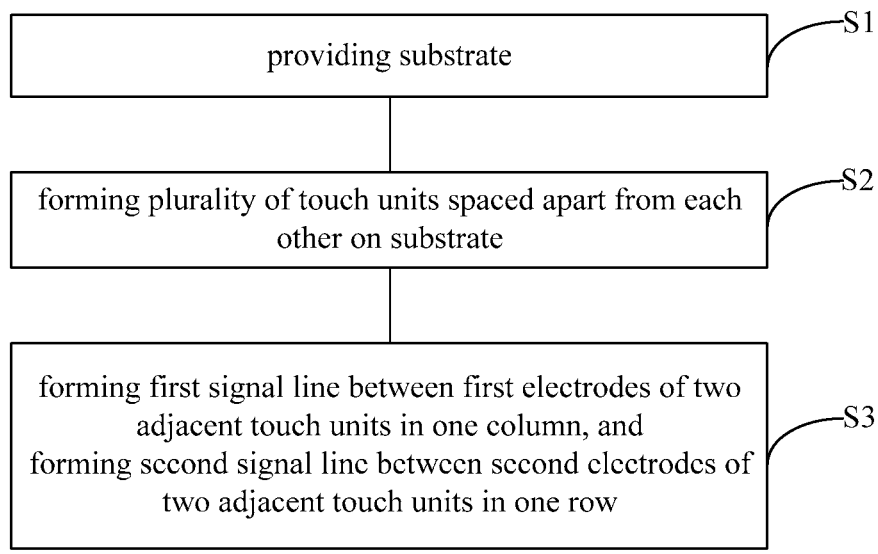
FIG. 6 schematically shows a flowchart of a method for manufacturing a touch substrate according to an embodiment of the present disclosure.
Figure 7:
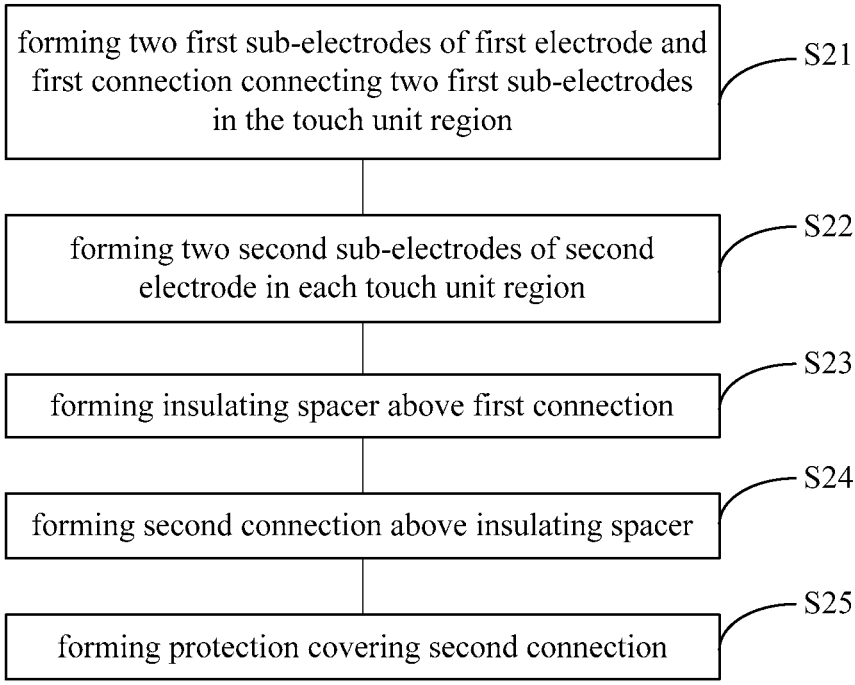
FIG. 7 schematically shows a flowchart of a method for manufacturing a touch substrate according to another embodiment of the present disclosure.

According to yet another aspect of the present disclosure, there is provided a method for manufacturing a touch substrate. FIG. 6 schematically shows a flowchart of the method. FIG. 7 schematically shows a flowchart of sub-steps of one step in the method. It should be understood that the sequence of the steps of the method is not limited to the sequence shown in FIG. 6 or FIG. 7, unless specifically stated to the opposite. The method will be described in detail below.

Firstly, providing a substrate 40 (step S1). In some embodiments, the substrate 40 can be a flexible substrate. The substrate 40 comprises a plurality of touch unit regions spaced apart from each other. The plurality of touch unit regions are arranged in rows and columns.

Then, forming a plurality of touch units 20 spaced apart from each other on the substrate 40 (step S2). The plurality of touch units 20 are arranged in rows and columns, and each touch unit 20 comprises a first electrode 21 and a second electrode 22 that are arranged crosswise and insulated and spaced apart from each other.

FIG. 7 schematically shows the sub-steps that the step of forming the plurality of touch units 20 spaced apart from each other (step S2) may comprise in some embodiments. As described above, the sequence of the sub-steps is not limited to the sequence shown in FIG. 7, unless specifically stated to the opposite. These sub-steps will be described below.

Two first sub-electrodes 21a of the first electrode 21 and a first connection 21b connecting the two first sub-electrodes 21a are formed in the touch unit region (step S21). The two first sub-electrodes 21a of each touch unit region are arranged in the direction of column. The touch unit region refers to a region defined on the substrate 40 for accommodating the touch unit 20.

Two second sub-electrodes 22a of the second electrode 22 are formed in each touch unit region (step S22). The two second sub-electrodes 22a of each touch unit region are arranged in the direction of row, and the projections of the two second sub-electrodes 22a on the substrate 40 are respectively at a first one and a second one of the two sides of the projection of the first connection 21b on the substrate 40. In an embodiment, the projections of the two second sub-electrodes 22a on the substrate 40 are spaced apart from the projection of the first connection 21b on the substrate 40.

An insulating spacer 23 is formed above the first connection 21b (step S23). This step may specifically comprise: forming a light-sensitive organic insulating layer and then exposing and developing the organic insulating layer to form a pattern comprising the insulating spacer 23.

The second connection 22b is formed above the insulating spacer 23 (step S24). The two second sub-electrodes 22a of the second electrode 22 are connected by the second connection 22b.

In some embodiments, the step S2 may further comprise forming a protection 24 covering the second connection 22b (step S25). The material of the protection 24 may also be a light-sensitive organic insulating material, such that it can be formed by employing steps of exposure and development.

In some embodiments, in the formed touch unit, the first connection 21b and the first sub-electrodes 21a connected thereto form an integral structure.

In some embodiments, the step of forming the two first sub-electrodes 21a of the first electrode 21 and the connection 21b connecting the two first sub-electrodes 21a in the touch unit region (step S21) and the step of forming two second sub-electrodes 22a of the second electrode 22 in the touch unit region (step S22) can be performed simultaneously. In this case, the step S21 and step S22 can be implemented by the following steps: forming a transparent material layer (that may be an indium tin oxide layer) and a photoresist layer; exposing and developing the photoresist layer to retain the photoresist in the region of the first sub-electrodes 21a, the second sub-electrodes 22a, and the first connection 21b and remove the photoresist of other regions; then, etching the transparent material layer to form a pattern comprising the first sub-electrodes 21a, the first connection 21b and the second sub-electrodes 22a; and finally, stripping the photoresist off.

The method for manufacturing a touch substrate according to an embodiment of the present disclosure further comprises forming a first signal line 31 between the first electrodes 21 of two adjacent touch units 20 in one of the columns, and forming a second signal line 32 between the second electrodes 22 of the two adjacent touch units 20 in one of the rows (step S3), such that the first electrodes 21 of the adjacent touch units 20 in one of the columns are connected by the first signal line 31, and the second electrodes 22 of the adjacent touch units 20 in one of the rows are connected by the second signal line 30.

In some embodiments, the step of forming the first signal line 31 between the first electrodes 21 of the adjacent touch units 20 in one of the columns and forming the second signal line 30 between the second electrodes 22 of the adjacent touch units 20 in one of the rows (step S3) and the step of forming a second connection 22b above the insulating spacer 23 (step S24) may be performed simultaneously. In that case, the step S3 and the step S24 can be implemented by the following steps: forming a metal material layer and a photoresist material layer, and forming a pattern comprising the first signal line 31, the second signal line 32 and the second connection 22b by employing steps similar to the above-mentioned exposure, development, etching, and stripping.

In summary, it is provided a touch substrate, a method for manufacturing a touch substrate, and a display device according to the embodiments of the present disclosure. The touch substrate comprises a substrate and a plurality of touch units spaced apart from each other on the substrate. The plurality of touch units are arranged in rows and columns and each of the plurality of touch units comprises a first electrode and a second electrode that are arranged crosswise and insulated and spaced apart from each other. The first electrodes of the adjacent touch units in one of the columns are connected by a first signal line, and the second electrodes of the adjacent touch units in one of the rows are connected by a second signal line.

The touch substrate according to the present disclosure comprises a plurality of touch units. The plurality of touch units are spaced apart from each other. Therefore, in the case that the touch substrate is a flexible touch substrate and is bent, the touch unit would effectively releases the stress to the surroundings, thereby preventing the first electrode and the second electrode in the touch unit from being fractured. The signal line can be made of a metal wire material with a relatively good bending property, thereby reducing the risk of the fracture of the touch film layer and improving the quality of the touch substrate. In addition, the signal line and the second connection of the second electrode in the touch unit can be formed simultaneously, so that the manufacturing process can be simplified.

Since the risk of the fraction of the touch film layer when the touch substrate is bent is reduced, the flexible display device using the touch substrate can still ensure the normal touch and display functions under the condition of bending, thereby improving the flexible performance and quality of the display device.

It can be understood that the above embodiments are merely exemplary embodiments for illustrating the principles of the present application, and the application is not limited thereto. Various modifications and improvements can be made by the person having ordinary skill in the art without departing from the spirit and essence of the present application. These modifications and improvements are also considered to be within the protection scope of the present application.

In addition, the terms "first", "second" and other similar terms in the specification or the claims are used to distinguish similar elements and are not necessarily used to describe a sequence or a chronological order. Also, the terms "firstly", "then", "next", "final" and the like are not used to describe a sequence or a chronological order as well. It will be understood that the embodiments described herein can operate in an order other than the order recited in the present disclosure. The article "a" or "an" preceding an element does not exclude that there may be a plurality of such elements.

We claim:

1. A touch substrate, comprising:
   a substrate; and
   a plurality of touch units spaced apart from each other on the substrate,
   wherein the plurality of touch units are arranged in rows and columns,
   wherein each of the plurality of touch units comprises a first electrode and a second electrode,
   wherein the first electrode and the second electrode are arranged crosswise and insulated and spaced apart from each other, the first electrode comprising two first sub-electrodes arranged in a direction of the column and a first connection connected between the two first sub-electrodes, the second electrode comprising two second sub-electrodes arranged in a direction of the row and a second connection connected between the two second sub-electrodes, a projection of each of the two first sub-electrodes on the substrate is a trapezoid, a short one of parallel sides of the projection of one of the two first sub-electrodes facing a short one of parallel sides of the projection of another one of the two first sub-electrodes, a projection of each of the two second sub-electrodes on the substrate is a trapezoid, a short one of parallel sides of the projection of one of the two second sub-electrodes facing a short one of parallel sides of the projection of another one of the two second sub-electrodes,
   wherein first electrodes of adjacent touch units in one of the columns are spaced apart from each other and connected by a first signal line, and
   wherein second electrodes of adjacent touch units in one of the rows are spaced apart from each other and connected by a second signal line.

2. The touch substrate of claim 1, wherein the direction of the row is perpendicular to the direction of the column.

3. The touch substrate of claim 1, wherein the first signal line and the second signal line comprise metal lines.

4. The touch substrate according to claim 1,
   wherein the first connection is insulated and spaced apart from the second connection, and
   wherein in each one of the plurality of touch units, projections of the two second sub-electrodes on the substrate are on both sides of a projection of the first connection on the substrate.

5. The touch substrate of claim 4, wherein the second connection is above the first connection, and the projections of the two second sub-electrodes on the substrate are spaced apart from the projection of the first connection on the substrate.

6. The touch substrate of claim 4, wherein in each one of the plurality of touch units, the first connection and the first sub-electrodes form an integral structure, and the first sub-electrodes and the second sub-electrodes are in a same layer.

7. The touch substrate of claim 4, wherein a material of the first sub-electrode is same as a material of the second sub-electrode.

8. The touch substrate of claim 4, wherein a material of the second connection is same as a material of the first signal line and the second signal line.

9. The touch substrate of claim 1, wherein the substrate comprises a flexible substrate.

10. A display device, comprising the touch substrate according to claim 1.

11. A method for manufacturing a touch substrate, comprising:
    providing a substrate;
    forming a plurality of touch units spaced apart from each other, wherein the plurality of touch units are arranged in rows and columns, and each of the plurality of touch units comprises a first electrode and a second electrode, wherein the first electrode and the second electrode are arranged crosswise and insulated and spaced apart from each other;
    forming a first signal line between first electrodes of adjacent touch units in one of the columns such that the first electrodes are spaced apart from each other and connected by the first signal line; and
    forming a second signal line between second electrodes of adjacent touch units in one of the rows such that the second electrodes are spaced apart from each other and connected by the second signal line,
    wherein the forming the plurality of touch units spaced apart from each other comprises:
      forming two first sub-electrodes of the first electrode and a first connection connecting the two first sub-electrodes in a touch unit region, wherein the two first sub-electrodes are arranged in a direction of the column, a projection of each of the two first sub-electrodes on the substrate is a trapezoid, and a short one of parallel sides of the projection of one of the two first sub-electrodes faces a short one of parallel sides of the projection of another one of the two first sub-electrodes; and
      forming two second sub-electrodes of the second electrode in the touch unit region, wherein the two second sub-electrodes are arranged in a direction of the row, a projection of each of the two second sub-electrodes on the substrate is a trapezoid, and a short one of parallel sides of the projection of one of the two second sub-electrodes faces a short one of parallel sides of the projection of another one of the two second sub-electrodes.

12. The method of claim 11, wherein the substrate comprises touch unit regions, each of which corresponds to a respective one of the plurality of touch units, and wherein the forming the plurality of touch units spaced apart from each other further comprises:

forming an insulating spacer above the first connection; and forming a second connection above the insulating spacer, wherein the two second sub-electrodes are connected by the second connection, and the projections of the two second sub-electrodes on the substrate are on both sides of a projection of the first connection on the substrate.

13. The method of claim 12, wherein the forming the two first sub-electrodes of the first electrode and the first connection connecting the two first sub-electrodes in the touch unit region and the forming the two second sub-electrodes of the second electrode in the touch unit region are performed simultaneously.

14. The method of claim 12, wherein the forming the first signal line between the first electrodes of the adjacent touch units in one of the columns and the forming the second signal line between the second electrodes of the adjacent touch units in one of the rows and the forming the second connection above the insulating spacer are conducted simultaneously.

15. The method of claim 12 further comprising:
forming a protection covering the second connection.

* * * * *